(12) United States Patent
Hong et al.

(10) Patent No.: US 11,669,270 B1
(45) Date of Patent: Jun. 6, 2023

(54) MULTI-CHANNEL MEMORY STORAGE DEVICE, MEMORY CONTROL CIRCUIT UNIT AND DATA READING METHOD

(71) Applicant: Hefei Core Storage Electronic Limited, Anhui (CN)

(72) Inventors: Wan-Jun Hong, Anhui (CN); Qi-Ao Zhu, Anhui (CN); Xin Wang, Anhui (CN); Yang Zhang, Anhui (CN); Xu Hui Cheng, Anhui (CN); Jian Hu, Anhui (CN)

(73) Assignee: Hefei Core Storage Electronic Limited, Anhui (CN)

( * ) Notice: Subject to any disclaimer, the term of this patent is extended or adjusted under 35 U.S.C. 154(b) by 13 days.

(21) Appl. No.: 17/579,537

(22) Filed: Jan. 19, 2022

(30) Foreign Application Priority Data

Dec. 23, 2021 (CN) .......................... 202111595367.9

(51) Int. Cl.
*G06F 3/06* (2006.01)
(52) U.S. Cl.
CPC .......... *G06F 3/0656* (2013.01); *G06F 3/0604* (2013.01); *G06F 3/0679* (2013.01)
(58) Field of Classification Search
CPC ..... G06F 3/0656; G06F 3/0604; G06F 3/0679
USPC ........................................................ 711/154
See application file for complete search history.

(56) References Cited

U.S. PATENT DOCUMENTS

| 10,503,433 | B2 | 12/2019 | Yeh | |
|---|---|---|---|---|
| 2014/0068152 | A1 | 3/2014 | Sinclair | |
| 2016/0054942 | A1 | 2/2016 | Yu et al. | |
| 2018/0150242 | A1* | 5/2018 | Yi | G06F 3/0656 |
| 2018/0173655 | A1* | 6/2018 | Achtenberg | G06F 3/0619 |
| 2018/0330467 | A1* | 11/2018 | Park | G06F 3/0664 |
| 2019/0095365 | A1* | 3/2019 | Gopal | G06F 3/0611 |
| 2020/0242055 | A1* | 7/2020 | Raj S V | G06F 13/1673 |
| 2021/0191625 | A1* | 6/2021 | Park | G06F 3/0656 |
| 2022/0155992 | A1* | 5/2022 | Nortman | G06F 9/544 |

(Continued)

FOREIGN PATENT DOCUMENTS

TW 202121176 6/2021

OTHER PUBLICATIONS

"Office Action of Taiwan Counterpart Application", dated Jan. 19, 2023, pp. 1-7.

*Primary Examiner* — Than Nguyen
(74) *Attorney, Agent, or Firm* — JCIPRNET

(57) ABSTRACT

A multi-channel memory storage device, a memory control circuit unit, and a data reading method are provided. The method includes: determining whether a storage space of a buffer memory is insufficient when a multi-channel access is performed; issuing a data read command corresponding to each of a plurality of multi-channels to a rewritable non-volatile memory module according to a logical address in a host read command in response to insufficient storage space of the buffer memory to read data corresponding to each of the plurality of multi-channels from a data storage area to a data cache area via the plurality of multi-channels; and allocating the storage space of the buffer memory to the rewritable non-volatile memory module after the storage space of the buffer memory is released and issuing a cache read command to move first data in data temporarily stored in the data cache area to the buffer memory.

15 Claims, 5 Drawing Sheets

(56) References Cited

U.S. PATENT DOCUMENTS

2022/0157353 A1* 5/2022 Kim ................... G06F 3/0656
2022/0197562 A1* 6/2022 Wada .................. G06F 3/0679

* cited by examiner

MULTI-CHANNEL MEMORY STORAGE DEVICE, MEMORY CONTROL CIRCUIT UNIT AND DATA READING METHOD

CROSS-REFERENCE TO RELATED APPLICATION

This application claims the priority benefit of China application serial no. 202111595367.9, filed on Dec. 23, 2021. The entirety of the above-mentioned patent application is hereby incorporated by reference herein and made a part of this specification.

BACKGROUND OF THE INVENTION

Field of the Invention

The invention relates to a memory data reading technique, and more particularly to a multi-channel memory storage device, a control circuit unit, and a data reading method thereof.

Description of Related Art

Portable electronic devices such as notebook computers and mobile phones have grown rapidly over the past few years, which has led to a rapid increase in consumer demand for storage media. Because rewritable non-volatile memory (for example, flash memory) has characteristics such as non-volatile data, power saving, small size, no mechanical structure, and fast read and write speed, rewritable non-volatile memory is very suitable for being built into the various portable electronic devices above. A solid-state disc is a memory storage device adopting a flash memory module as storage medium. Therefore, the flash memory industry has become a relatively important part in the electronic industry in recent years.

In general, the memory storage device is configured with static random-access memory (SRAM) or dynamic random-access memory (DRAM) as a buffer memory for accessing data. The capacity of the configured buffer memory is usually limited. For a multi-channel memory storage device, the capacity of the buffer memory is usually insufficient to temporarily store the accessed data when the host system continuously reads data. Therefore, the efficient use of the allocated buffer memory to manage and access data is a technical necessity.

SUMMARY OF THE INVENTION

The invention provides a multi-channel memory storage device, a control circuit unit, and a data reading method thereof that may sufficiently achieve the advantage of fast reading when data is read by multi-channel access.

The invention provides a data reading method suitable for a multi-channel memory storage device including a memory control circuit unit and a rewritable non-volatile memory module. The memory control circuit unit includes a buffer memory, and the rewritable non-volatile memory module includes a data cache area and a data storage area. The method includes: determining whether a storage space of a buffer memory is insufficient when a multi-channel access is performed according to a host read command from a host system; issuing a data read command corresponding to each of a plurality of multi-channels to a rewritable non-volatile memory module according to a logical address in a host read command in response to insufficient storage space of the buffer memory to read data corresponding to each of the plurality of multi-channels from the data storage area to the data cache area via the plurality of multi-channels; and allocating the storage space of the buffer memory to the rewritable non-volatile memory module after the storage space of the buffer memory is released and issuing a cache read command to the rewritable non-volatile memory module to move first data in data temporarily stored in the data cache area to the buffer memory. In particular, a data volume of the first data matches a capacity of the storage space released by the buffer memory.

In an embodiment of the invention, the step of determining whether the storage space of the buffer memory is insufficient includes: determining whether the storage space configured in the buffer memory configured to temporarily store the read data temporary storage area from the rewritable non-volatile memory module is insufficient.

In an embodiment of the invention, the data storage area includes a plurality of memory dies, and a plurality of first memory dies in the plurality of memory dies are connected to a first channel in the plurality of channels, and a plurality of second memory dies in the plurality of memory dies are connected to a second channel in the plurality of channels. In particular, the step of issuing the data read command corresponding to each of the plurality of channels to the rewritable non-volatile memory module to read the data corresponding to each of the plurality of channels from the data storage area to the data cache area via the plurality of channels includes: issuing the data read command corresponding to the first channel and the second channel to read data corresponding to the data read command from the plurality of first memory dies and the plurality of second memory dies to the data cache area via the first channel and the second channel at the same time.

In an embodiment of the invention, the cache read command is a direct memory access transfer.

In an embodiment of the invention, the method further includes: issuing a next cache read command to the rewritable non-volatile memory module after the first data temporarily stored in the buffer memory is transferred to the host system to release the storage space of the buffer memory to move second data in the data temporarily stored in the data cache area to the buffer memory.

The invention provides a multi-channel memory storage device including a connection interface unit, a rewritable non-volatile memory module, and a memory control circuit unit. The connection interface unit is configured to be coupled to a host system. The rewritable non-volatile memory module includes a data cache area and a data storage area. The memory control circuit unit is coupled to the connection interface unit and the rewritable non-volatile memory module. The memory control circuit unit includes a buffer memory. In particular, the memory control circuit unit is configured to determine whether a storage space of the buffer memory is insufficient when a multi-channel access is performed according to a host read command from a host system. The memory control circuit unit is further configured to issue a data read command corresponding to each of the plurality of channels to the rewritable non-volatile memory module according to a logical address in the host read command in response to insufficient storage space of the buffer memory to read data corresponding to each of the plurality of channels from the data storage area to the data cache area via the plurality of channels to the data cache area. Moreover, the memory control circuit unit is further configured to allocate the storage space of the buffer memory to the rewritable non-volatile memory module and issue a cache read command to the rewritable non-volatile memory module after the storage space of the buffer memory is released to move first data in data temporarily stored in the data cache area to the buffer memory. In particular, a data volume of the first data matches a capacity of the storage space released by the buffer memory.

In an embodiment of the invention, in the operation of determining whether the storage space of the buffer memory is insufficient, the memory control circuit unit is further configured to determine whether the storage space configured in the buffer memory configured to temporarily store the read data temporary storage area from the rewritable non-volatile memory module is insufficient.

In an embodiment of the invention, the data storage area includes a plurality of memory dies, and a plurality of first memory dies in the plurality of memory dies are connected to a first channel in the plurality of channels, and a plurality of second memory dies in the plurality of memory dies are connected to a second channel in the plurality of channels. In particular, the memory control circuit unit is further configured to issue the data read command corresponding to the first channel and the second channel to read data corresponding to the data read command from the plurality of first memory dies and the plurality of second memory dies to the data cache area via the first channel and the second channel at the same time.

In an embodiment of the invention, the cache read command is a direct memory access transfer.

In an embodiment of the invention, the memory control circuit unit is further configured to issue a next cache read command to the rewritable non-volatile memory module after the first data temporarily stored in the buffer memory is transferred to the host system to release the storage space of the buffer memory to move second data in the data temporarily stored in the data cache area to the buffer memory.

The invention provides a memory control circuit unit configured to control a rewritable non-volatile memory module including a data cache area and a data storage area. The memory control circuit unit includes a host interface, a memory interface, a buffer memory, and a memory management circuit. The host interface is configured to be coupled to a host system. The memory interface is configured to be coupled to the rewritable non-volatile memory module. The memory management circuit is coupled to the host interface, the memory interface, and the buffer memory. In particular, the memory management circuit is configured to determine whether a storage space of the buffer memory is insufficient when a multi-channel access is performed according to a host read command from a host system. The memory management circuit is further configured to issue a data read command corresponding to each of the plurality of channels to the rewritable non-volatile memory module according to a logical address in the host read command in response to insufficient storage space of the buffer memory to read data corresponding to each of the plurality of channels from the data storage area via the plurality of channels to the data cache area. Moreover, the memory management circuit is further configured to allocate the storage space of the buffer memory to the rewritable non-volatile memory module and issue a cache read command to the rewritable non-volatile memory module after the storage space of the buffer memory is released to move first data in data temporarily stored in the data cache area to the buffer memory. In particular, a data volume of the first data matches a capacity of the storage space released by the buffer memory.

In an embodiment of the invention, in the operation of determining whether the storage space of the buffer memory is insufficient, the memory management circuit is further configured to determine whether the storage space configured in the buffer memory configured to temporarily store the read data temporary storage area from the rewritable non-volatile memory module is insufficient.

In an embodiment of the invention, the data storage area includes a plurality of memory dies, and a plurality of first memory dies in the plurality of memory dies are connected to a first channel in the plurality of channels, and a plurality of second memory dies in the plurality of memory dies are connected to a second channel in the plurality of channels. In particular, the memory management circuit is further configured to issue the data read command corresponding to the first channel and the second channel to read data corresponding to the data read command from the plurality of first memory dies and the plurality of second memory dies to the data cache area via the first channel and the second channel at the same time.

In an embodiment of the invention, the cache read command is a direct memory access transfer.

In an embodiment of the invention, the memory management circuit is further configured to issue a next cache read command to the rewritable non-volatile memory module after the first data temporarily stored in the buffer memory is transferred to the host system to release the storage space of the buffer memory to move second data in the data temporarily stored in the data cache area to the buffer memory.

Based on the above, the multi-channel memory storage device, the control circuit unit, and the data reading method provided by the invention may first stack the busy time of data upload by reading data to the data cache area when the multi-channel access is continuously performed. When the available space of the buffer memory in the memory control circuit unit is sufficient, the storage space is allocated to the data cache area for internal data transfer. In this way, the time for performing data upload may be reduced, so that even when the buffer space is limited during the operation of the memory storage device, the advantage of fast reading during data reading by multi-channel access may still be sufficiently achieved.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In general, a memory storage device (also referred to as a memory storage system or a multi-channel memory storage device) includes a rewritable non-volatile memory module and a controller (also referred to as a control circuit). The memory storage device is generally used with a host system, such that the host system may write data into the memory storage device or read data from the memory storage device.

Figure 1:
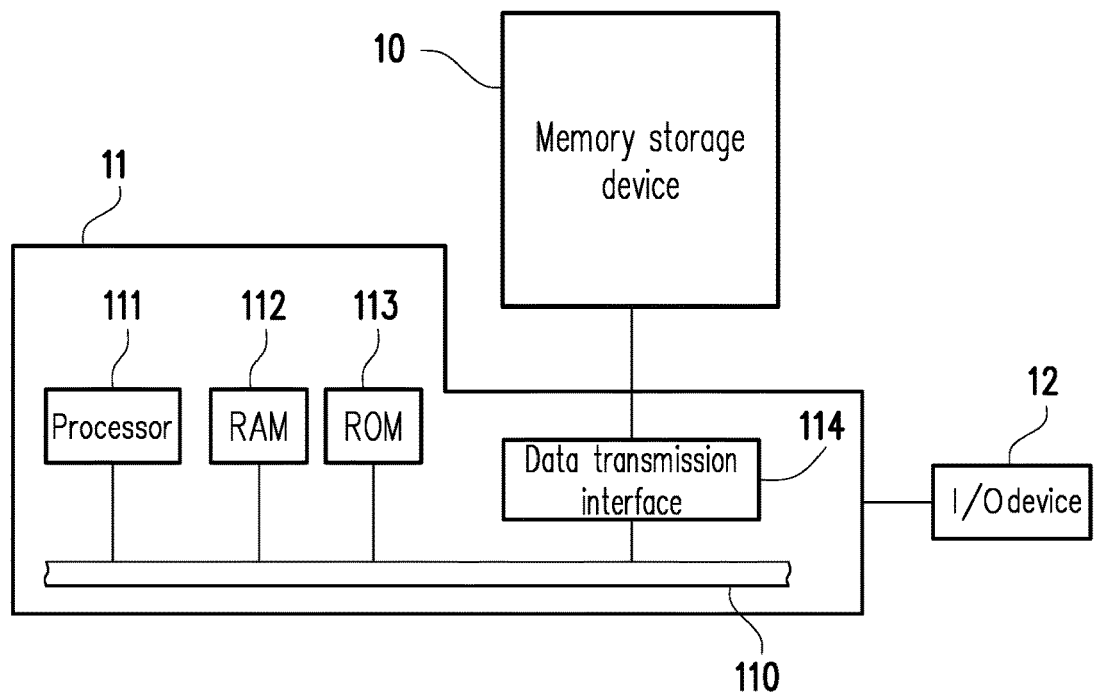
FIG. 1 is a schematic diagram of a host system, a memory storage device, and an input/output (I/O) device shown according to an exemplary embodiment of the invention.
Figure 2:
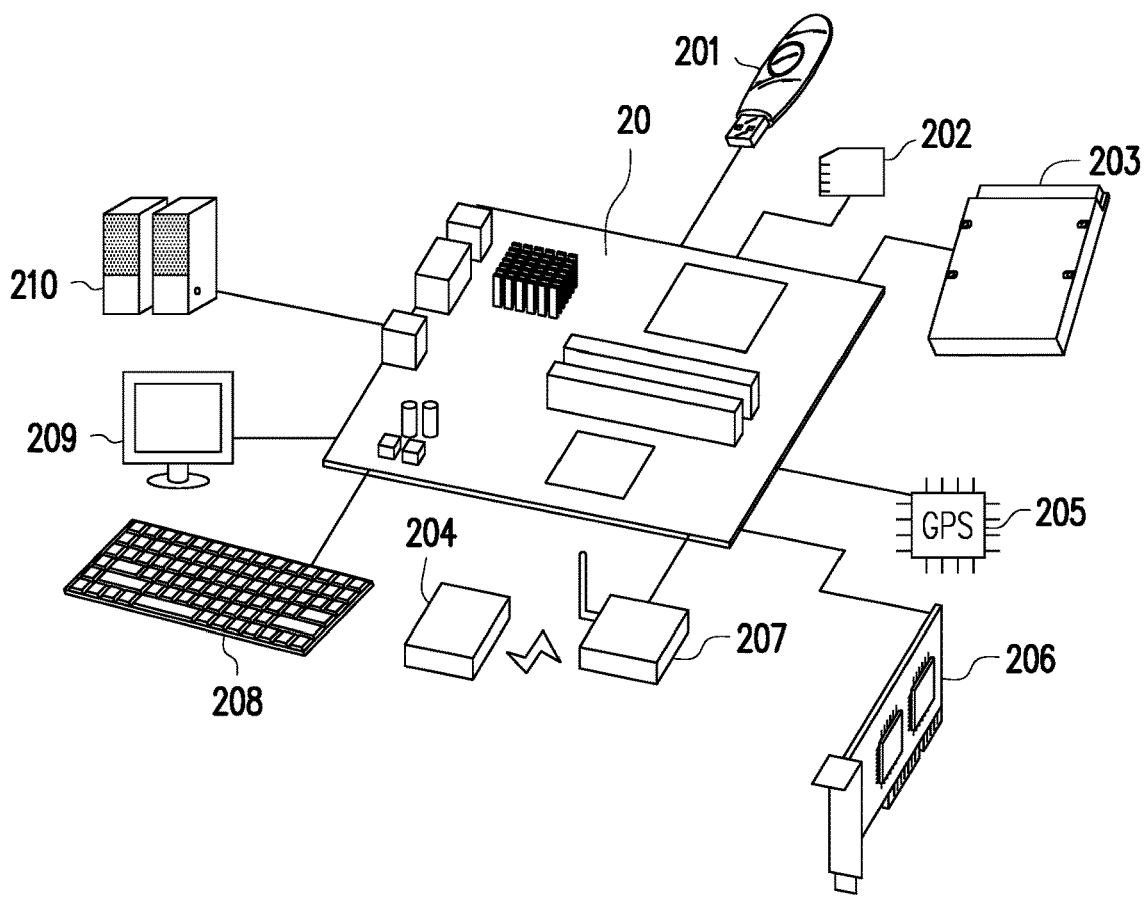
FIG. 2 is a schematic diagram of a host system, a memory storage device, and an I/O device shown according to another exemplary embodiment of the invention.

FIG. 1 is a schematic diagram of a host system, a memory storage device, and an input/output (I/O) device shown according to an exemplary embodiment of the invention. FIG. 2 is a schematic diagram of a host system, a memory storage device, and an I/O device shown according to another exemplary embodiment of the invention.

Referring to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to the memory storage device 10 via the data transmission interface 114. For example, the host system 11 may store data into the memory storage device 10 or read data from the memory storage device 10 via the data transmission interface 114. Moreover, the host system 11 is coupled to the I/O device 12 via the system bus 110. For example, the host system 11 may send an output signal to the I/O device 12 or receive an input signal from the I/O device 12 via the system bus 110.

In the present exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114. The memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

Figure 3:
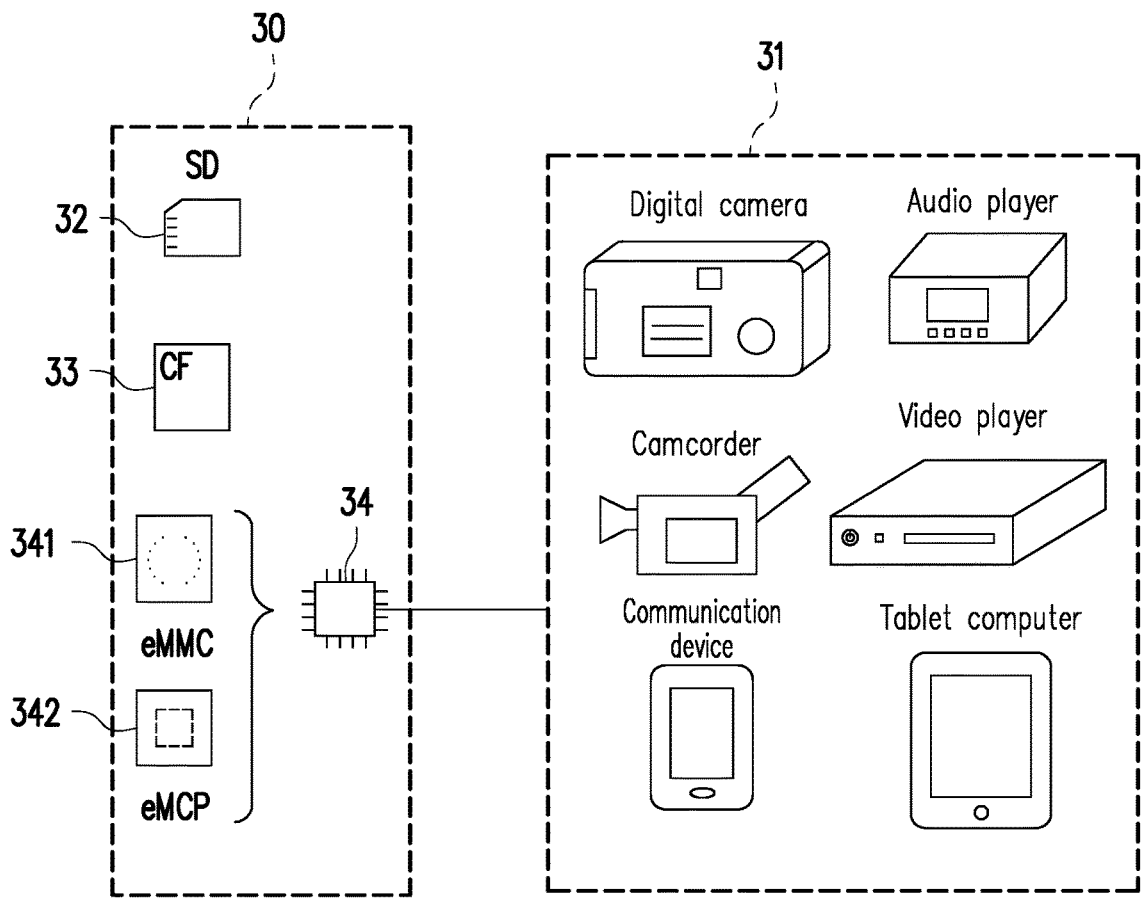
FIG. 3 is a schematic diagram of a host system and a memory storage device shown according to another exemplary embodiment of the invention.

In an exemplary embodiment, the mentioned host system is any system that may substantially store data with the memory storage device. Although in the above exemplary embodiments, the host system is exemplified by a computer system, FIG. 3 is a schematic diagram of a host system and a memory storage device shown according to another exemplary embodiment of the invention. Referring to FIG. 3, in another exemplary embodiment, a host system 31 may also be a system such as a digital camera, a camcorder, a communication device, an audio player, a video player, or a tablet computer, and the memory storage device 30 may be various non-volatile memory storage devices used thereby such as an SD card 32, a CF card 33, or an embedded storage device 34. The embedded storage device 34 includes various types of embedded storage devices for which a memory module is directly coupled on the substrate of the host system, such as an embedded multimedia card (eMMC) 341 and/or an embedded multi-chip package (eMCP) storage device 342.

Figure 4:
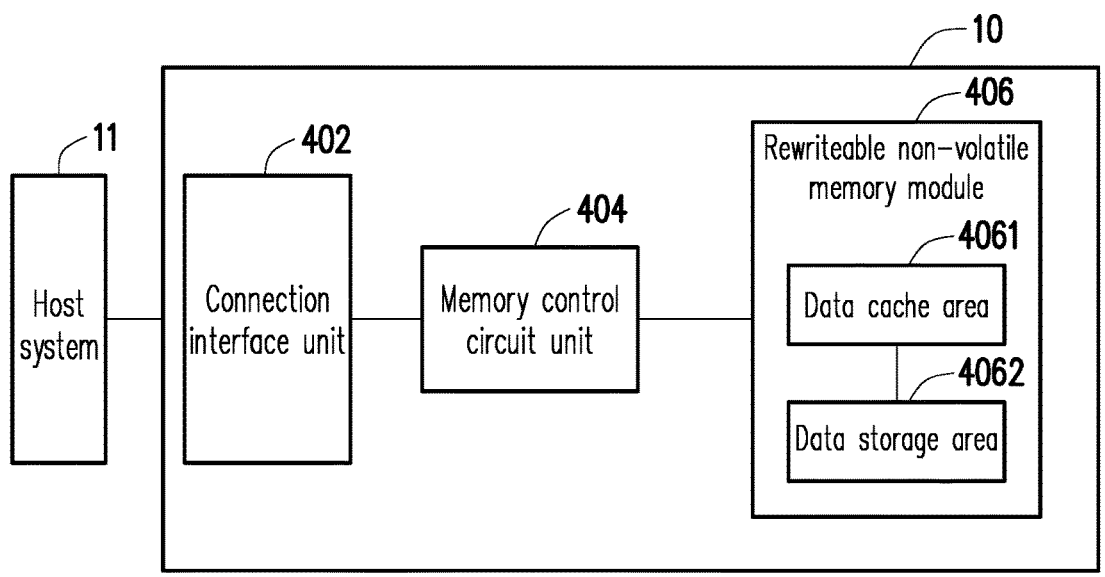
FIG. 4 is a schematic block diagram of a memory storage device shown according to an exemplary embodiment of the invention.

FIG. 4 is a schematic block diagram of a memory storage device shown according to an exemplary embodiment of the invention. Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 via the connection interface unit 402. In the present exemplary embodiment, the connection interface unit 402 is compatible with the serial advanced technology attachment (SATA) standard. However, it should be understood that the invention is not limited thereto, and the connection interface unit 402 may also comply with the Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be sealed in a chip with the memory control circuit unit 404. Alternatively, the connection interface unit 402 is disposed outside of a chip containing the memory control circuit unit 404.

The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is coupled to the memory control circuit unit 404 and configured to store data written by the host system 11. The rewritable non-volatile memory module 406 includes a data cache area 4061 and a data storage area 4062. In the present exemplary embodiment, the data cache area 4061 and the data storage area 4062 are packaged in the same memory chip. In an exemplary embodiment, the data cache area 4061 and the data storage area 4062 belong to the same memory die. In other exemplary embodiments, the data cache area 4061 and the data storage area 4062 may also belong to different memory dies, and the invention is not limited thereto.

The rewritable non-volatile memory module 406 may be a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

The rewritable non-volatile memory module 406 includes a plurality of memory cells arranged in a matrix. Each of the memory cells in the rewritable non-volatile memory module 406 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 406 has a plurality of storage statuses. Which storage status one memory cell belongs to may be determined via the application of a read voltage, so as to obtain one or a plurality of bits stored by the memory cell.

In the present exemplary embodiment, the memory cells of the rewritable non-volatile memory module 406 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the data write speed of the lower physical programming units is greater than the data write speed of the upper physical programming units, and/or the reliability of the lower physical programming units is greater than the reliability of the upper physical programming units.

In the present exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an error correction code). In the present exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
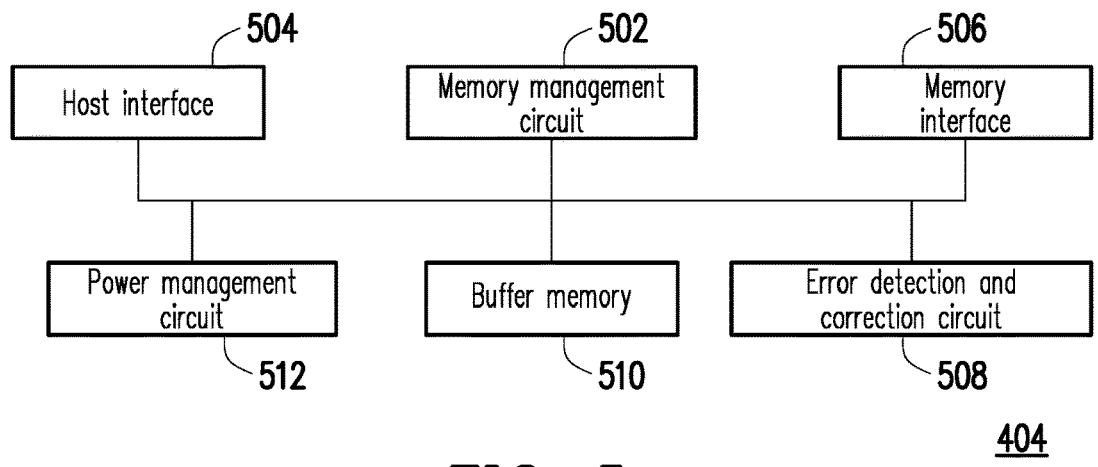
FIG. 5 is a schematic block diagram of a memory control circuit unit shown according to an exemplary embodiment of the invention.

FIG. 5 is a schematic block diagram of a memory control circuit unit shown according to an exemplary embodiment of the invention. Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. During operation of the memory storage device 10, the control commands are executed to perform operations such as writing, reading, and erasing data. In the following, descriptions relating to the operation of the memory management circuit 502 are equivalent to the descriptions of the operation of the memory control circuit unit 404.

In the present exemplary embodiment, the control commands of the memory management circuit 502 are implemented in a firmware form. For example, the memory management circuit 502 has a microprocessor unit (not shown) and a read-only memory (not shown), and the control commands are burned into the ROM. During the operation of the memory storage device 10, the control commands are executed by the microprocessor unit to perform operations such as writing, reading, and erasing data.

In another exemplary embodiment, the control commands of the memory management circuit 502 may also be stored in the form of program codes in a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Next, the microprocessor unit runs the control commands to perform operations such as writing, reading, and erasing data.

Further, in another exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence may independently include one or a plurality of program codes or command codes and be configured to instruct the rewritable non-volatile memory module 406 to perform corresponding operations such as writing, reading, and erasing. In an exemplary embodiment, the memory management circuit 502 may also issue other types of command sequences to the rewritable non-volatile memory module 406 to instruct the performance of corresponding operations.

The host interface 504 is coupled to the memory management circuit 502. The memory management circuit 502 may communicate with the host system 11 via the host interface 504. The host interface 504 may be used to receive and identify commands and data sent by the host system 11. For example, the commands and data sent by the host system 11 may be sent to the memory management circuit 502 via the host interface 504. In addition, the memory management circuit 502 may send data to the host system 11 via the host interface 504. In the present exemplary embodiment, the host interface 504 is compatible with the SATA standard. However, it should be understood that the invention is not limited thereto, and the host interface 504 may also be compatible with the PATA standard, IEEE 1394 standard, PCI Express standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 sends a corresponding command sequence. For example, the command sequence may include a write command sequence instructing data writing, a read command sequence instructing data reading, an erase command sequence instructing data erasing, and a corresponding command sequence configured to instruct various memory operations (such as changing read voltage level or executing a garbage collection operation). The command sequence is generated by, for example, the memory management circuit 502 and sent to the rewritable non-volatile memory module 406 via the memory interface 506. The command sequence may include one or a plurality of signals or data on a bus. The signals or data may include a command code or a program code. For example, when reading a command sequence, information such as read identification code or memory address is included.

In an exemplary embodiment, the memory control circuit unit 404 further includes an error detecting and correcting circuit 508, a buffer memory 510, and a power management circuit 512.

The error detecting and correcting circuit 508 is coupled to the memory management circuit 502 and configured to execute an error detecting and correcting operation to ensure the correctness of data. Specifically, when the memory management circuit 502 receives a write command from the host system 11, the error detecting and correcting circuit 508 generates a corresponding error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 reads the ECC and/or the EDC corresponding to the data at the same time, and the error detecting and correcting circuit 508 executes an error detecting and correcting operation on the read data based on the ECC and/or the EDC.

The buffer 510 is coupled to the memory management circuit 502 and configured to temporarily store data and commands from the host system 11 or data from the rewritable non-volatile memory module 406. The buffer memory 510 may be a static random-access memory (SRAM), a dynamic random-access memory (DRAM), etc., and the invention is not limited in this regard. The power management circuit 512 is coupled to the memory management circuit 502 and configured to control the power of the memory storage device 10.

In an exemplary embodiment, the rewritable non-volatile memory module 406 of FIG. 4 is also referred to as a flash memory module, and the memory control circuit unit 404 is also referred to as a flash memory controller configured to control the flash memory module. In an exemplary embodiment, the memory management circuit 502 of FIG. 5 is also referred to as a flash memory management circuit.

Figure 6:
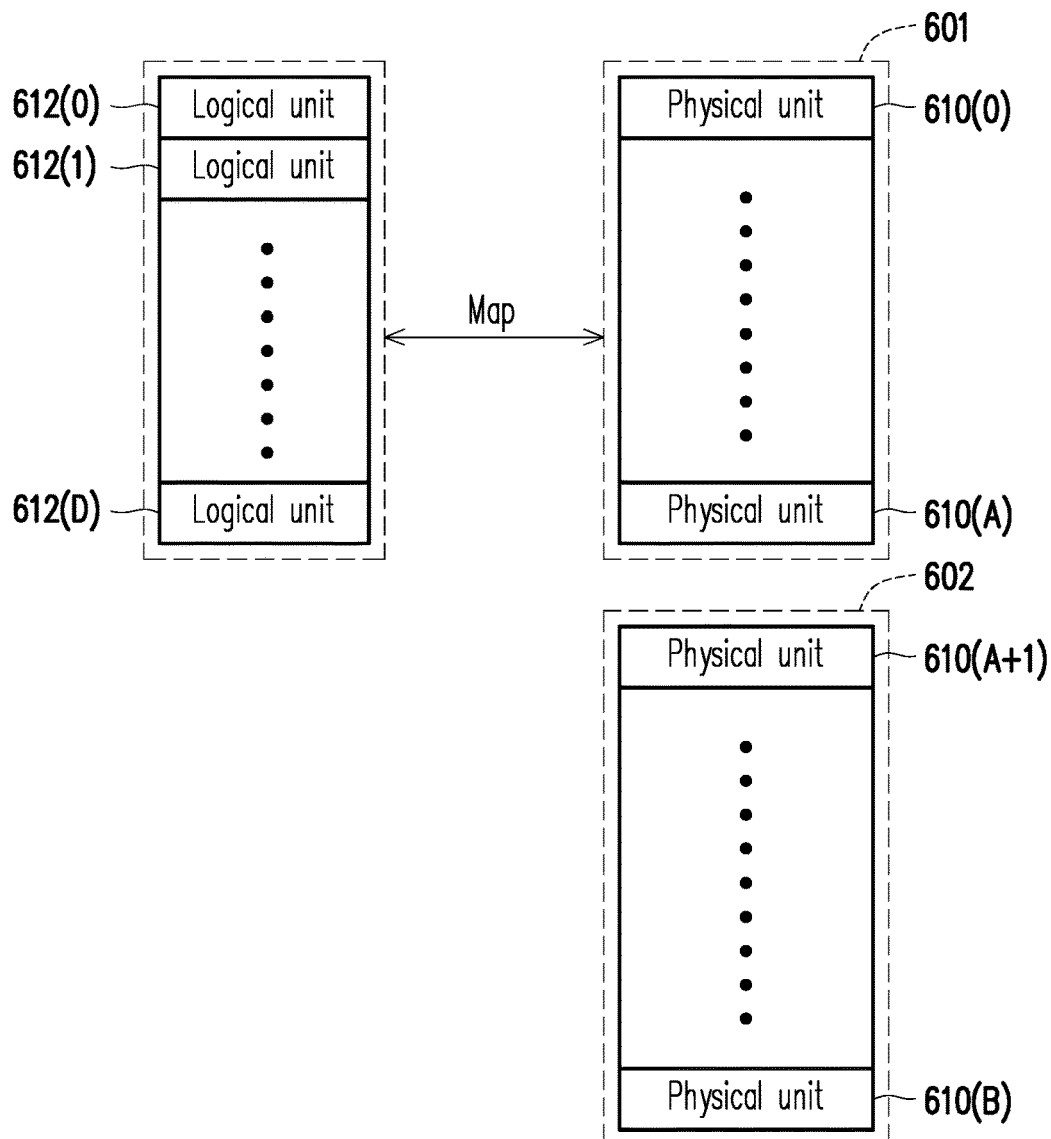
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. Referring to FIG. 6, the memory management circuit 502 may logically group physical units 610(0) to 610(B) of the rewritable non-volatile memory module 406 into a storage area 601 and a free area 602. The physical units 610(0) to 610(A) in the storage area 601 and the physical units 610(A+1) to 610(B) in the free area 602 are configured to store data from the host system 11. Specifically, the physical units of the storage area 601 are regarded as physical units in which data is stored, and the physical units of the free area 602 are configured to substitute the physical units of the storage area 601. That is to say, when receiving the write command and the data to be written from the host system 11, the memory management circuit 502 uses the physical units extracted from the free area 602 to write the data to replace the physical units in the storage area 601.

In the present exemplary embodiment, each physical unit refers to one physical erasing unit. However, in another exemplary embodiment, one physical unit may also refer to one physical address, one physical programming unit, or be formed by a plurality of continuous or discontinuous physical addresses. The memory management circuit 502 configures logical units 612(0) to 612(C) to map the physical units 610(0) to 610(A) in the storage area 601. In the present exemplary embodiment, each of the logical units refers to one logical address. However, in another exemplary embodiment, one logical unit may also refer to one logic programming unit, one logic erasing unit, or formed by a plurality of continuous or discontinuous logical addresses. In addition, each of the logical units 612(0) to 612(C) may be mapped to one or a plurality of physical units.

The memory management circuit 502 may record the mapping relationship between the logical units and the physical units (also referred to as a logical-physical address mapping relationship) in at least one logical-physical address mapping table. When the host system 11 is to read data from the memory storage device 10 or write data to the memory storage device 10, the memory management circuit 502 may execute a data access operation on the memory storage device 10 according to the logical-physical address mapping table.

Generally, the memory management circuit 502 divides the storage space of the buffer memory 510 into a plurality of areas to store data. For example, the memory management circuit 502 may divide the buffer memory 510 into a mapping table temporary storage area, a firmware code temporary storage area, a write data temporary storage area, a read data temporary storage area, and other areas. The mapping table temporary storage area is, for example, configured to store at least a portion of a mapping table (for example, a logical-physical address mapping table). The firmware code temporary storage area is configured to store a program code executed by the memory management circuit 502. The write data temporary storage area is configured to temporarily store the data to be written to the rewritable non-volatile memory module 406, and the read data temporary storage area is configured to temporarily store the data read from the rewritable non-volatile memory module 406. However, the division of the buffer memory 510 area is not limited thereto.

As described above, the storage space of the buffer memory 510 is planned in advance to store the program or data that needs to be temporarily stored during the operation of the memory storage device 10. Due to the limited space of each area in the buffer memory 510, when a data read operation is performed, the memory management circuit 502 needs to release the storage space of the read data temporary storage area in the buffer memory 510 to receive more data read from the rewritable non-volatile memory module 406.

Figure 7A:
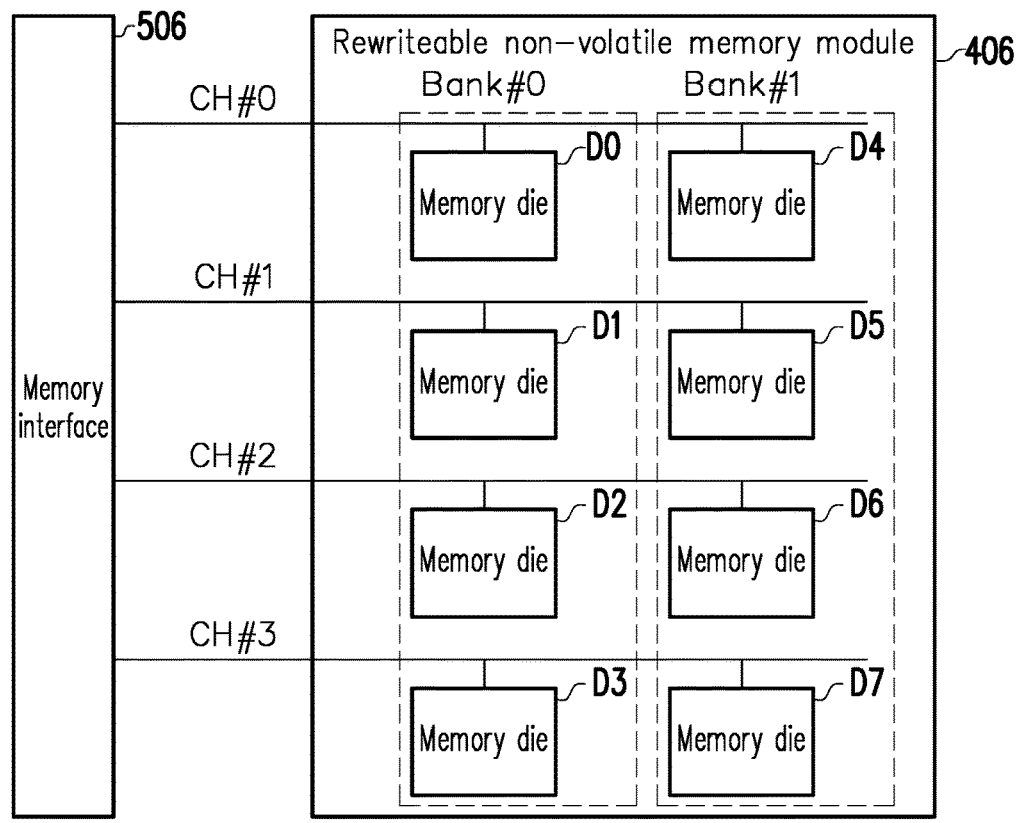
FIG. 7A and FIG. 7B are schematic diagrams of a multi-channel memory storage device shown according to an exemplary embodiment of the invention.
Figure 7B:
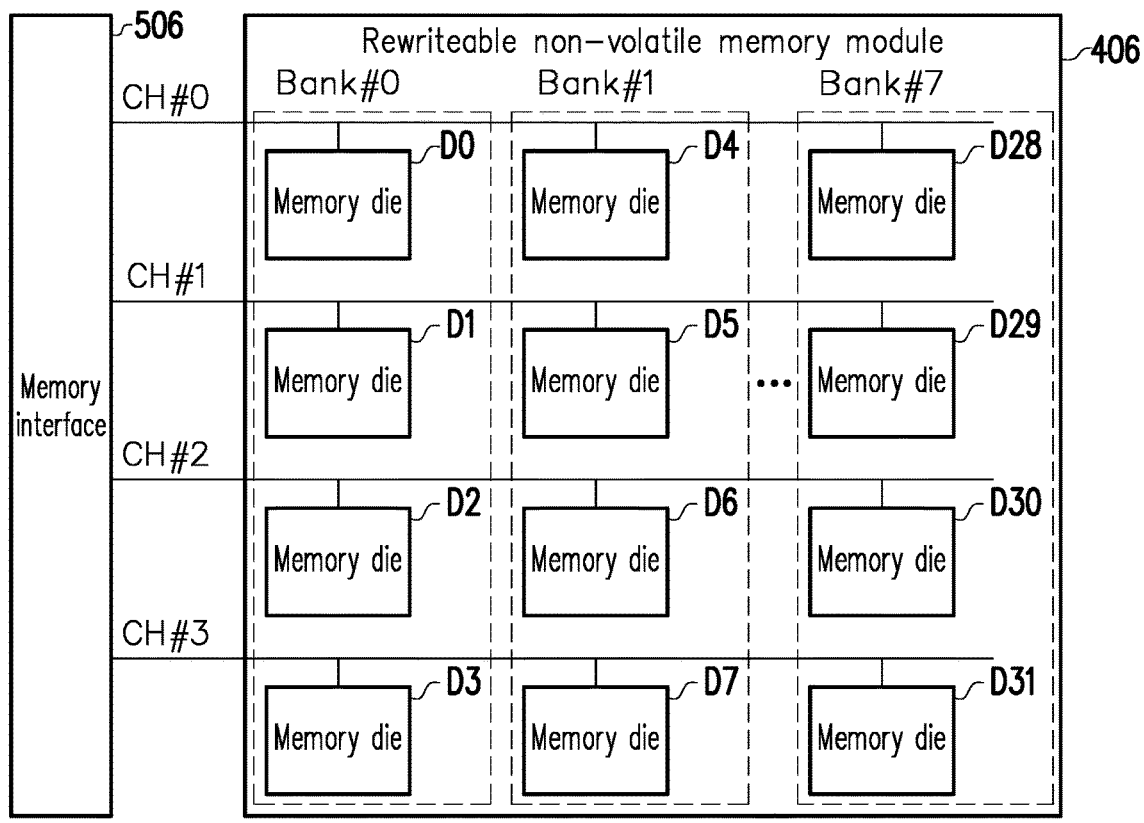

FIG. 7A and FIG. 7B are schematic diagrams of a multi-channel memory storage device shown according to an exemplary embodiment of the invention. The rewritable non-volatile memory module 406 may include a plurality of memory dies, and each memory die is the smallest independent unit in the rewritable non-volatile memory module 406 that may execute a command and report its own state, and therefore may be used as a unit for parallel operation. It should be mentioned that, the memory management circuit 502 may perform different operation modes according to the anticipated execution of single channel access or multi-channel access, wherein single-channel access means that only one input/output bus is activated at the same time to access the memory die, and multi-channel access means that a plurality of input/output buses are activated at the same time to access the memory die.

FIG. 7A takes four channels as an example for illustration, but the invention does not limit the number of channels of the memory interface 506 here, which may be two, eight, or more channels. As shown in the embodiment of FIG. 7A, the memory interface 506 includes four channels CH#0 to CH#3, and each channel is connected with two memory dies. Therefore, the rewritable non-volatile memory module 406 of the present embodiment includes eight memory dies D0 to D7. In other words, a plurality of memory dies may share one channel, and memory dies between a plurality of channels may be accessed by using multi-channel access to increase the efficacy of data access.

The memory dies with the same corresponding address in each channel may form a bank that may perform an interleaving operation, and the interleaving operation may simultaneously access different banks. In the present exemplary embodiment, the eight memory dies D0 to D7 connected to the channels CH#0 to CH#3 may form banks Bank#0 and Bank#1. The memory dies in the same bank may share the chip enable (CE). It is assumed that each memory die in the present embodiment is divided into two planes and it is assumed that the capacity of each of the plurality of physical pages included in the plane is 16K, wherein each plane contains its own page register and cache register to allow parallel operation. In this situation, since a parallel operation is performed by four channels, bank interleaving is performed by two banks, and a parallel operation is performed by two planes of each memory die. When the memory management circuit 502 satisfies the multi-channel simultaneous reading situation, up to 256K (4×4×16K) of data may be read at the same time. Therefore, in order to achieve the maximum performance of multi-channel simultaneous reading, the read data temporary storage area in the buffer memory 510 needs to be planned to have a storage space of 256K in advance.

However, if the capacity of the rewritable non-volatile memory module 406 is expanded, when the available storage space of the buffer memory 510 is limited, the performance of data reading by multi-channel access may not be fully realized. For example, referring to FIG. 7B, the rewritable non-volatile memory module 406 is expanded to eight memory dies connected to the same channel. The rewritable non-volatile memory module 406 includes 32 memory dies D0 to D31. In this situation, since a parallel operation is performed by four channels, bank interleaving is performed by four banks, and a parallel operation is performed by two planes of each memory die. When the memory management circuit 502 satisfies the multi-channel simultaneous reading situation, up to 512K (4×8×16K) of data may be read at the same time. However, since the read data temporary storage area of the buffer memory 510 is only planned to have a storage space of 256K, the buffer memory 510 may not accommodate the maximum data volume that may be read simultaneously when the data is read by multi-channel access. The memory management circuit 502 needs to release the storage space of the read data temporary storage area in the buffer memory 510 to receive more data read from the rewritable non-volatile memory module 406. Therefore, when the resources of the buffer memory 510 are insufficient and when the host system continuously reads a lot of data, the advantage of data reading by multi-channel access may not be achieved.

Accordingly, the data reading method provided by an exemplary embodiment of the invention may make the memory storage device 10 sufficiently utilize the advantage of data reading by multi-channel access during operation. In an exemplary embodiment, the memory management circuit 502 issues a data read command and a cache read command to the rewritable non-volatile memory module 406 via the memory interface 506 to read the data according to the logical address in the host read command from the host system 11. For example, the cache read command is a direct memory access (DMA) transfer.

Referring to FIG. 4, the data cache area 4061 is configured to temporarily store the data transferred between the memory control circuit unit 404 and the rewritable non-volatile memory module 406. Referring to FIG. 4 and FIG. 5, when the host system 11 is to read data from the rewritable non-volatile memory module 406 of the memory storage device 10, the memory management circuit 502 may issue a data read command and a cache read command to the rewritable non-volatile memory module 406 via the memory interface 506 according to the host read command from the host system 11. At this time, the rewritable non-volatile memory module 406 first moves the data to be read from the data storage area 4062 to the data cache area 4061 in the rewritable non-volatile memory module 406 according to the data read command. This process may be called data upload. After data upload is complete, the data in the data cache area 4061 is moved to the memory control circuit unit 404 (for example, the buffer memory 510 in the memory control circuit unit 404) according to the cache read command. This process may be called internal data transfer. Once the buffer memory 510 prepares the data to be read, the host system 11 may read the data from the buffer memory 510. This process may be referred to as external data transfer. The data cache area 4061 configured to receive data from the data storage area 4062 may include a cache register contained in each plane in the memory dies. In particular, the cache register may temporarily store data of at least one page to correspond to the reading unit (for example, one page).

It should be mentioned that, during the data upload process, after the memory management circuit 502 issues a data read command, the rewritable non-volatile memory module 406 moves at least one page of data from the data storage area 4062 to the data cache area 4061 according to the data read command. During this period, the rewritable non-volatile memory module 406 is in a busy state. At this time, the memory management circuit 502 may not issue any command to the rewritable non-volatile memory module 406 in busy state. The rewritable non-volatile memory module 406 returns to ready state after the data temporarily stored in the data cache area 4061 is moved to the buffer memory 510.

Figure 8A:
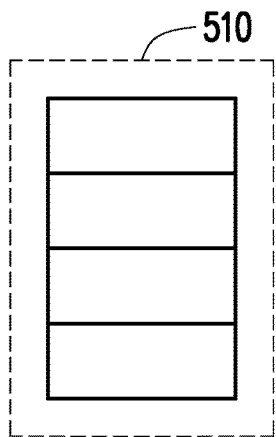
FIG. 8A to FIG. 8C are schematic diagrams of performing data buffer in a read data temporary storage area in a buffer memory shown according to an exemplary embodiment of the invention.
Figure 8B:
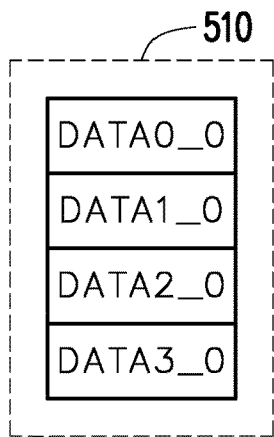
Figure 8C:
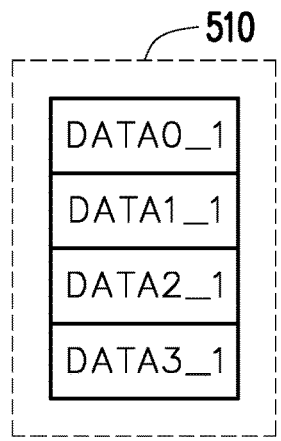

FIG. 8A to FIG. 8C are schematic diagrams of performing data buffer in a read data temporary storage area in a buffer memory shown according to an exemplary embodiment of the invention. Referring to FIG. 8A, it is assumed that the buffer memory 510 includes four pages in the read data temporary storage area, and the capacity of each page is 16K. In the present exemplary embodiment, the host system 11 and the memory storage device 10 of FIG. 4 are used as an example to describe data buffering, wherein the memory control circuit unit 404 includes the buffer memory 510 shown in FIG. 8A, and the rewritable non-volatile memory module 406 is implemented as the rewritable non-volatile memory module 406 in FIG. 7B.

In the present exemplary embodiment, the memory management circuit 50 first allocates the storage space of the buffer memory 510 to the rewritable non-volatile memory module 406 as a read data temporary storage area according to the host read command from the host system 11, and issues the data read command and the cache read command to the rewritable non-volatile memory module 406 via the memory interface 506. It is assumed that this data read command instructs to continuously read data of four physical pages from the memory dies D0 to D3 by multi-channel access. At this time, the rewritable non-volatile memory module 406 performs the above data upload according to the data read command to first move the data to be read (for example, data DATA0_0 in the memory die D0, data DATA1_0 in the memory die D1, data DATA2_0 in the memory die D2, and data DATA3_0 in the memory die D3) from the memory dies D0 to D3 to the data cache area 4061 in the rewritable non-volatile memory module 406. After the data upload is complete, the internal data transfer above is performed to move the data DATA0_0 to DATA3_0 in the data cache area 4061 to the read data temporary storage area in the buffer memory 510 according to the cache read command. Once the buffer memory 510 prepares the data DATA0_0 to DATA3_0 to be read (as shown in FIG. 8B), the external data transfer above is performed, and the host system 11 may read the data DATA0_0 to DATA3_0 from the read data temporary storage area. After the data DATA0_0 to DATA3_0 are read, the buffer memory 510 may release the storage space of the read data temporary storage area, as shown in FIG. 8A, and the read data temporary storage area in the buffer memory 510 does not temporarily store data and is in ready state. Therefore, in the present exemplary embodiment, the memory storage device 10 receives the host read command and executes data upload, internal data transfer, and external data transfer in order to read data from the rewritable non-volatile memory module 406.

However, only four pages are configured in the buffer memory 510 of the present exemplary embodiment as a read data temporary storage area. If the data read command instructs to continuously read data of more than four physical pages by multi-channel access, the memory storage device 10 needs to first perform one round of data upload, internal data transfer, and external data transfer before performing the next round of data upload, internal data transfer, and external data transfer to complete the reading of the data. For example, it is assumed that the data read command instructs to continuously read data of a total of eight physical pages from the memory dies D0 to D7 by multi-channel access. At this time, the memory storage device 10 performs the operations corresponding to FIG. 8A to FIG. 8B, and releases the storage space of the read data temporary storage area after the data DATA0_0 to DATA3_0 in the buffer memory 510 are read by the host system 11. Then, the rewritable non-volatile memory module 406 performs the data upload above to first move the data to be read (for example, data DATA0_1 to DATA3_1 stored in the memory dies D4 to D7) from the memory dies D4 to D7 to the data cache area 4061 in the rewritable non-volatile memory module 406. After the data upload is complete, the internal data transfer above is executed to transfer the data DATA0_1 to DATA3_1 in the data cache area 4061 to the buffer memory 510. Once the buffer memory 510 prepares the data DATA0_1 to DATA3_1 to be read (as shown in FIG. 8C), the external data transfer above is performed, and the host system 11 may read the data DATA0_1 to DATA3_1 from the buffer memory 510. After the data DATA0_1 to DATA3_1 are read, the buffer memory 510 may have no stored data as shown in FIG. 8A or FIG. 8C.

Therefore, in the present exemplary embodiment, when the memory management circuit 502 is to read more than the capacity of the read data temporary storage area configured in the buffer memory 510, the memory management circuit 502 needs to wait for the buffer memory 510 to be released (that is, after the data is transferred to the host system 11) before sending the next data read command and the cache read command to the rewritable non-volatile memory module 406. Therefore, in the present exemplary embodiment, the total time needed to read the data DATA0_0 to DATA3_0 and the data DATA0_1 to DATA3_1 from the rewritable non-volatile memory module 406 according to the host read command is as follows:

$$\text{Total time\_1}=(tR+tDMA+tHost)\times 2$$

In particular, Total time_1 is the total time for reading data, tR is the time for performing data upload, tDMA is the time for performing internal data transfer, and tHost is the time for performing external data transfer. In other words, when the present exemplary embodiment performs multi-channel access to continuously read data of a total of eight physical pages from the memory dies D0 to D7, even though the memory management circuit 502 may simultaneously read the stored data DATA0_0 to DATA3_0 from the memory dies D0 to D3 and read the stored data DATA0_1 to DATA3_1 from the memory dies D4 to D7 via the four channels CH#0 to CH#3, it is necessary to wait for the storage space of the read data temporary storage area to be released before the next round of data upload, internal data transfer, and external data transfer of the data DATA0_1 to DATA3_1 stored in the memory dies D4 to D7 due to the limited storage space of the read data temporary storage area configured in the buffer memory 510 of the present embodiment. As a result, the advantage of reading a plurality of data at the same time during multi-channel access cannot be achieved, and therefore the performance of data reading by multi-channel access may not be fully realized.

Therefore, in an exemplary embodiment, the memory management circuit 502 may determine whether the storage space of the buffer memory 510 is insufficient when performing multi-channel access according to the host read command from the host system 11, that is, whether the storage space of the buffer memory 510 is full. For example, in addition, when determining whether the storage space of the buffer memory 510 is insufficient, the memory management circuit 502 determines whether the storage space configured in the buffer memory 510 configured to temporarily store the read data temporary storage area from the rewritable non-volatile memory module 406 is insufficient.

In the present exemplary embodiment, in response to insufficient storage space of the buffer memory 510, the memory management circuit 502 issues a data read command corresponding to each channel to the rewritable non-volatile memory module 406 via the memory interface 506 according to the logical address in the host read command to read the data corresponding to each channel from the data storage area 4062 to the data cache area 4061 via each channel. Specifically, the data read command includes the physical address mapped by the logical address in the host read command. The rewritable non-volatile memory module 406 may read the data corresponding to each channel from the data storage area 4062 to the data cache area 4061 according to the physical address in the data read command.

After all the data corresponding to the data read command is read to the data cache area 4061, the memory management circuit 502 waits for the buffer memory 510 to release storage space. After the storage space of the buffer memory 510 is released, the memory management circuit 502 allocates the storage space of the buffer memory 510 to the rewritable non-volatile memory module 406 and issues a cache read command to the rewritable non-volatile memory module 406 to move the data temporarily stored in the data cache area 4061 from the data cache area 4061 to the buffer memory 510. Specifically, the cache read command instructs to move the first data in the data temporarily stored in the data cache area 4061 from the data cache area 4061 to the buffer memory 510. The data volume of the first data matches the capacity of the storage space released by the buffer memory 510. Moreover, after transferring the first data to the host system 11 to release the storage space of the buffer memory 510, the memory management circuit 502 issues a cache read command to the rewritable non-volatile memory module 406 to move the second data in the data temporarily stored in the data cache area 4061 to the buffer memory 510. The data volume of the second data matches the capacity of the storage space released by the buffer memory 510.

For example, it is assumed that a plurality of host read commands instruct to continuously read data of a total of eight physical pages from the memory dies D0 to D7 of FIG. 7B. In the present exemplary embodiment, the host system 11 and the memory storage device 10 of FIG. 4 are taken as an example to describe the data buffering, wherein the memory control circuit unit 404 includes the buffer memory 510 shown in FIG. 8A.

In the present exemplary embodiment, since the memory dies D0 to D7 storing the data to be read correspond to the plurality of channels CH#0 to CH#3, the memory management circuit 502 performs multi-channel access. At this time, it is assumed that the storage space of the buffer memory 510 is insufficient, and the memory management circuit 502 issues a data read command corresponding to each of the channels CH#0 to CH#3 to the rewritable non-volatile memory module 406. The rewritable non-volatile memory module 406 reads the data DATA0_0 to DATA3_0 corresponding to the data read command from the memory dies D0 to D3 included in the Bank#0 and reads the data DATA0_1 to DATA3_1 corresponding to the data read command from the memory dies D4 to D7 included in the Bank#1 to the data cache area 4061 at the same time according to the data read command. When reading all data to the data cache area 4061, the memory management circuit 502 waits for the buffer memory 510 to release storage space.

After the memory management circuit 502 releases the storage space of the buffer memory 510, the memory management circuit 502 allocates the storage space of the buffer memory 510 to the data cache area 4061, and issues a cache read command to the data cache area 4061 to move the data DATA0_0 to DATA3_0 in the data temporarily stored in the data cache area 4061 from the data cache area 4061 to the buffer memory 510. The data volume of the data DATA0_0 to DATA3_0 matches the capacity of the storage space released by the buffer memory 510. Moreover, after transferring the data DATA0_0 to DATA3_0 to the host system 11 to release the storage space of the buffer memory 510, the memory management circuit 502 issues a cache read command to the data cache area 4061 to move the DATA0_1 to DATA3_1 in the data temporarily stored in the data cache area 4061 from the data cache area 4061 to the buffer memory 510.

Therefore, in the present exemplary embodiment, the total time needed to read the data DATA0_0 to DATA3_0 and the data DATA0_1 to DATA3_1 from the rewritable non-volatile memory module 406 according to the host read command is as follows:

$$\text{Total time\_2}=tR+(tDMA+tHost)\times 2$$

In particular, Total time_2 is the total time for reading data, tR is the time for performing data upload, tDMA is the time for performing internal data transfer, and tHost is the time for performing external data transfer. Here, the total time Total time_2 for reading data in the present exemplary embodiment reduces the time tR for performing data upload compared with the total time Total time_1 for reading data in the above embodiment.

It should be mentioned that, if the host read command intends to read more data in the memory dies included in the bank by multi-channel access at the same time, the data reading method provided in the present exemplary embodiment may save more time tR for performing data upload.

Figure 9:
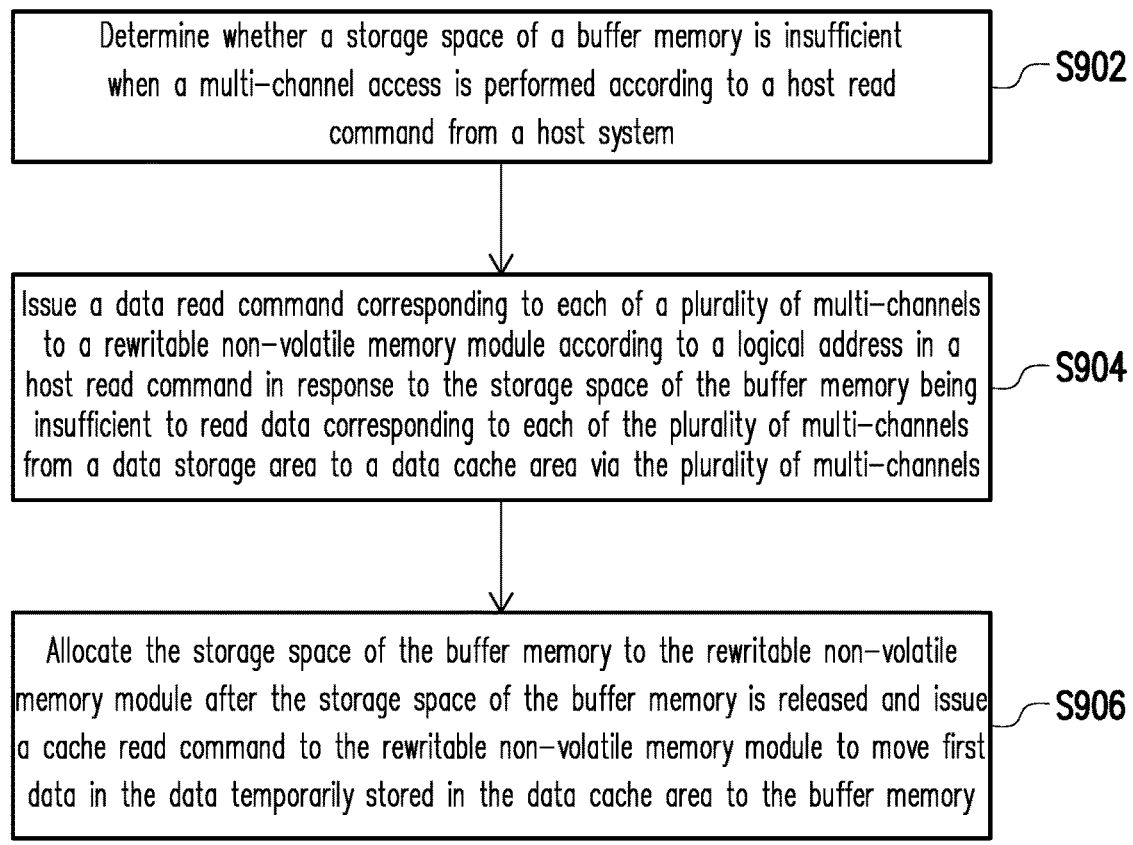
FIG. 9 is a flowchart of a data reading method shown according to an exemplary embodiment of the invention.

FIG. 9 is a flowchart of a data reading method shown according to an exemplary embodiment of the invention.

In step S902, when the multi-channel access is performed according to the host read command from the host system, whether the storage space of the buffer memory is insufficient is determined. In step S904, a data read command corresponding to each of the plurality of channels is issued to the rewritable non-volatile memory module according to a logical address in the host read command in response to insufficient storage space of the buffer memory to read data corresponding to each of the plurality of channels from the data storage area via the plurality of channels to the data cache area. In step S906, the storage space of the buffer memory is allocated to the rewritable non-volatile memory module and a cache read command is issued to the rewritable non-volatile memory module after the storage space of the buffer memory is released to move first data in data temporarily stored in the data cache area to the buffer memory.

However, each step in FIG. 9 is as described in detail above, and is not repeated herein. It should be mentioned that, each step in FIG. 9 may be implemented as a plurality of program codes or circuits, and the invention is not limited thereto. Moreover, the method of FIG. 9 may be used with the above exemplary embodiments, and may also be used alone, and the invention is not limited thereto.

Based on the above, the multi-channel memory storage device, the control circuit unit, and the data reading method provided by the invention may first stack the busy time of data upload by reading data to the data cache area when the multi-channel access is continuously performed. When the available space of the buffer memory in the memory control circuit unit is sufficient, the storage space is allocated to the data cache area for internal data transfer. In this way, the time for performing data upload may be reduced, so that even when the buffer space is limited during operation of the memory storage device, the advantage of fast reading during data reading by multi-channel access may still be sufficiently achieved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A data reading method, suitable for a multi-channel memory storage device comprising a memory control circuit unit and a rewritable non-volatile memory module, wherein the memory control circuit unit comprises a buffer memory, the rewritable non-volatile memory module comprises a data cache area and a data storage area, and the method comprises:
   determining whether a storage space of the buffer memory is insufficient when a multi-channel access is performed according to a host read command from a host system;
   issuing a data read command corresponding to each of the plurality of channels to the rewritable non-volatile memory module according to a logical address in the host read command in response to insufficient storage space of the buffer memory to read data corresponding to each of the plurality of channels from the data storage area via the plurality of channels to the data cache area; and
   allocating the storage space of the buffer memory to the rewritable non-volatile memory module and issuing a cache read command to the rewritable non-volatile memory module after the storage space of the buffer memory is released to move first data in data temporarily stored in the data cache area to the buffer memory,
   wherein a data volume of the first data matches a capacity of the storage space released by the buffer memory.

2. The data reading method of claim 1, wherein the step of determining whether the storage space of the buffer memory is insufficient comprises:
   determining whether a storage space configured in the buffer memory for temporarily storing a read data temporary storage area from the rewritable non-volatile memory module is insufficient.

3. The data reading method of claim 1, wherein the data storage area comprises a plurality of memory dies, a plurality of first memory dies of the plurality of memory dies are connected to a first channel of the plurality of channels, and a plurality of second memory dies of the plurality of memory dies are connected to a second channel in the plurality of channels, wherein the step of issuing the data read command corresponding to each of the plurality of channels to the rewritable non-volatile memory module to read the data corresponding to each of the plurality of channels from the data storage area to the data cache area via the plurality of channels comprises:
   issuing the data read command corresponding to the first channel and the second channel to read data corresponding to the data read command from the plurality of first memory dies and the plurality of second memory dies to the data cache area via the first channel and the second channel at the same time.

4. The data reading method of claim 1, wherein the cache reading command is a direct memory access transfer.

5. The data reading method of claim 1, wherein the method further comprises:
   issuing a next cache read command to the rewritable non-volatile memory module after the first data temporarily stored in the buffer memory is transferred to the host system to release the storage space of the buffer memory to move second data in the data temporarily stored in the data cache area to the buffer memory.

6. A multi-channel memory storage device, comprising:
   a connection interface unit configured to be coupled to a host system;
   a rewritable non-volatile memory module comprising a data cache area and a data storage area; and
   a memory control circuit unit coupled to the connection interface unit and the rewritable non-volatile memory module, wherein the memory control circuit unit comprises a buffer memory,
   wherein the memory control circuit unit is configured to determine whether a storage space of the buffer memory is insufficient when a multi-channel access is performed according to a host read command from the host system,
   the memory control circuit unit is further configured to issue a data read command corresponding to each of the plurality of channels to the rewritable non-volatile memory module according to a logical address in the host read command in response to insufficient storage space of the buffer memory to read data corresponding to each of the plurality of channels from the data storage area via the plurality of channels to the data cache area, and
   the memory control circuit unit is further configured to allocate a storage space of the buffer memory to the rewritable non-volatile memory module and issue a cache read command to the rewritable non-volatile memory module after the storage space of the buffer memory is released to move first data in data temporarily stored in the data cache area to the buffer memory, wherein a data volume of the first data matches a capacity of the storage space released by the buffer memory.

7. The multi-channel memory storage device of claim 6, wherein in the operation of determining whether the storage space of the buffer memory is insufficient, the memory control circuit unit is further configured to determine whether the storage space configured in the buffer memory configured to temporarily store a read data temporary storage area from the rewritable non-volatile memory module is insufficient.

8. The multi-channel memory storage device of claim 6, wherein the data storage area comprises a plurality of memory dies, a plurality of first memory dies of the plurality of memory dies are connected to a first channel of the plurality of channels, and a plurality of second memory dies of the plurality of memory dies are connected to a second channel in the plurality of channels, wherein the memory control circuit unit is further configured to issue the data read command corresponding to the first channel and the second channel to read data corresponding to the data read command from the plurality of first memory dies and the plurality of second memory dies to the data cache area via the first channel and the second channel at the same time.

9. The multi-channel memory storage device of claim 6, wherein the cache reading command is a direct memory access transfer.

10. The multi-channel memory storage device of claim 6, wherein the memory control circuit unit is further configured to issue a next cache read command to the rewritable non-volatile memory module after the first data temporarily stored in the buffer memory is transferred to the host system to release the storage space of the buffer memory to move second data in the data temporarily stored in the data cache area to the buffer memory.

11. A memory control circuit unit, configured to control a rewritable non-volatile memory module comprising a data cache area and a data storage area, wherein the memory control circuit unit comprises:

a host interface configured to be coupled to a host system;

a memory interface configured to be coupled to the rewritable non-volatile memory module;

a buffer memory; and a memory management circuit coupled to the host interface, the memory interface, and the buffer memory, wherein the memory management circuit is configured to determine whether a storage space of the buffer memory is insufficient when a multi-channel access is performed according to a host read command from a host system, the memory management circuit is further configured to issue a data read command corresponding to each of the plurality of channels to the rewritable non-volatile memory module according to a logical address in the host read command in response to insufficient storage space of the buffer memory to read data corresponding to each of the plurality of channels from the data storage area via the plurality of channels to the data cache area, and the memory management circuit is further configured to allocate a storage space of the buffer memory to the rewritable non-volatile memory module and issue a cache read command to the rewritable non-volatile memory module after the storage space of the buffer memory is released to move first data in data temporarily stored in the data cache area to the buffer memory, wherein a data volume of the first data matches a capacity of the storage space released by the buffer memory.

12. The memory control circuit unit of claim 11, wherein in the operation of determining whether the storage space of the buffer memory is insufficient, the memory management circuit is further configured to determine whether the storage space configured in the buffer memory configured to temporarily store a read data temporary storage area from the rewritable non-volatile memory module is insufficient.

13. The memory control circuit unit of claim 11, wherein the data storage area comprises a plurality of memory dies, a plurality of first memory dies of the plurality of memory dies are connected to a first channel of the plurality of channels, and a plurality of second memory dies of the plurality of memory dies are connected to a second channel in the plurality of channels, wherein the memory management circuit is further configured to issue the data read command corresponding to the first channel and the second channel to read data corresponding to the data read command from the plurality of first memory dies and the plurality of second memory dies to the data cache area via the first channel and the second channel at the same time.

14. The memory control circuit unit of claim 11, wherein the cache reading command is a direct memory access transfer.

15. The memory control circuit unit of claim 11, wherein the memory management circuit is further configured to issue a next cache read command to the rewritable non-volatile memory module after the first data temporarily stored in the buffer memory is transferred to the host system to release the storage space of the buffer memory to move second data in the data temporarily stored in the data cache area to the buffer memory.

\* \* \* \* \*